June 16, 1942.  J. R. LOWRY  2,286,557
VALVE FOR MILKING MACHINES
Filed July 22, 1940

INVENTOR.
JESSE R. LOWRY
BY M. Talbert Dick
ATTORNEY.

Patented June 16, 1942

2,286,557

REISSUED

UNITED STATES PATENT OFFICE 2,286,557

VALVE FOR MILKING MACHINES

Jesse R. Lowry, Des Moines, Iowa

Application July 22, 1940, Serial No. 346,682

8 Claims. (Cl. 31—82)

The principal object of this invention is to provide a simple and sanitary valve for mechanical milking machines.

A further object of this invention is to provide a valve for milking machines that may be quickly and easily detached or replaced.

A still further object of this invention is to provide a valve for milking machines that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Most milking machines have intermittent pressure and suction applied through the line. Obviously a check valve or valves are necessary in the line to receive and dispose of the milk obtained. The chief objections to most of these valves are that they are complicated, are difficult to clean and keep in a sanitary condition and are difficult to detach from or replace into the line of the mechanism. I have overcome such objections as will hereinafter be appreciated.

Figure 1:
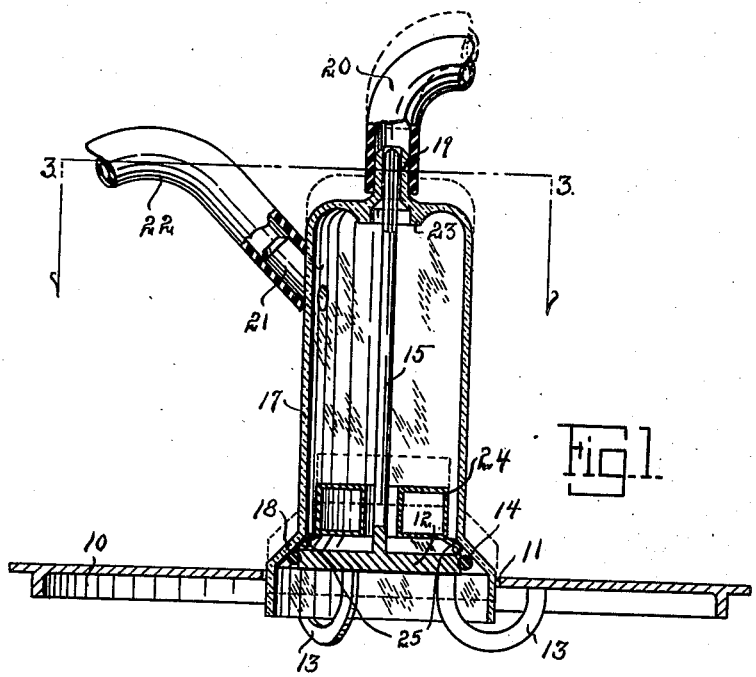
Fig. 1 is a side sectional view of my device installed in the line and ready for use.
Figures 2, 3, 4:
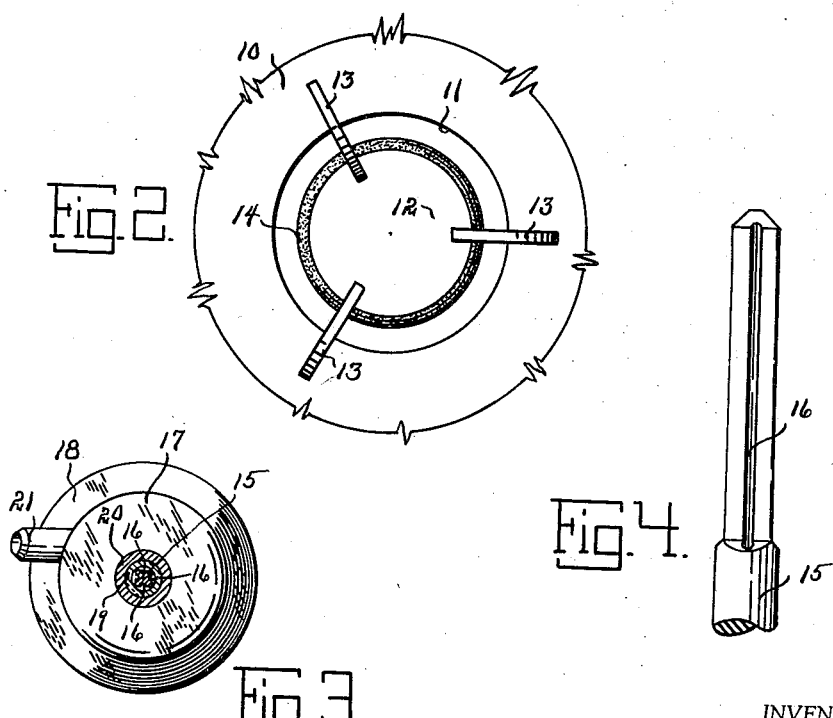
Fig. 2 is a bottom plan view of the fixed plate portion of the valve mechanism.
Fig. 3 is a top plan view of the device taken on line 3—3 of Fig. 1 and more fully illustrates its construction.
Fig. 4 is an enlarged side view of the upper portion of the valve guiding stem.

Referring to the drawing, I have used the numeral 10 to designate a plate member designed to cover an open receptacle such as a milk pail, milk can, or like. This base plate 10 also serves as a part of my valve. The numeral 11 designates a circular opening cut in and through the member 10. The numeral 12 designates a disc element supported by the brackets 13 in a horizontal plane slightly above the top point of the member 10 as shown in Fig. 1. This disc element 12 is so positioned that its vertical axis cuts a path in the center of the circular opening 11. The brackets 13 are U-shaped, each having one of their ends extending downwardly from the under side of the member 10 and then curved upwardly to engage and support the horizontal disc 12. The members 10, 12, and 13 are rigidly secured together and if desired may be cast in one piece. The diameter of the circular disc 12 is less than that of the diameter of the opening 11 and is formed with a continuous receiving groove around its periphery as shown in Fig. 1. The numeral 14 designates a rubber ring or like resilient band resting in the groove and extending completely around the periphery of the disc 12. The numeral 15 designates a post extending upwardly from the center of the disc 12. The upper end of this post 15 is reduced in diameter and provided with vertical groove passageways 16 as shown in Fig. 3 and Fig. 4. The extreme upper end of the post is pointed to facilitate the guiding of the moveable portion of the valve onto the same. The elements 10, 12, 13, 14 and 15 may be considered as the fixed or non-movable portions of my valve. The numeral 17 designates the inverted cup portion of the movable portion of the valve. This inverted cup member 16 has at least its major side walls of transparent material such as glass so that the flow of milk through the valve may be observed. In the drawing, I show the entire inverted cup portion as made of glass or other transparent material. The lower end portion of the inverted cup member 16 extends downwardly and outwardly and then downwardly as shown in Fig. 1. The diameter of the extreme lower end of the inverted cup member is slightly less than that of the diameter of the opening 11, while the central portion of the inverted elongated cup member is of a diameter substantially less than that of the diameter of the rubber ring 14. By this construction, the extreme lower portion of the cup member may pass downwardly within the opening 11 and freely past the disc 12, but due to the fact that the central portion of the cup member is less than that of the disc, that portion of the inverted cup member that extends outwardly and downwardly and which I have designated by the numeral 18 may engage and rest on and be supported by the rubber ring 14. Obviously when the inverted cup member is in a lowered position for engagement with the rubber ring 14, the inside of the cup will be sealed at its lower end portion and when the cup member is raised to a position as shown by dotted lines in Fig. 1, the flared wall 18 of the cup will be out of engagement with the rubber ring gasket and the inside of the cup will be in communication with a receptacle or like placed under the member 10. The numeral 19 designates a hollow stem integrally formed on the center of the bottom of the inverted cup 17 and which slidably loosely embraces the upper end of the post 15. By this construction, the cup may move upwardly or downwardly in proper alignment on and with the stationary portions of the valve. The numeral 20 designates a flexible tube having one end embracing the hollow stem 19 and its other end designed to be in communication with the suction and pressure means of a milking machine and which usually consists of a reciprocating piston operating within a cylinder. The inside of the inverted cup member is therefore always in communication with the pressure and suction means of the milking machine by virtue of the air passageways 16. The numeral 21 designates a pipe stem communicating with the inside top portion of the inverted cup 18 as shown in Fig. 3. This member 21 extends downwardly and slightly at an angle to the radii of the cup 18. The numeral 22 designates a flexible tube having one end embracing the member 21 and its other end designed to extend to and communicate with the elements that embrace the teats of the cow to be milked.

The practical operation of the device is as follows:

When a suction or minus pressure exists within the tube 20, the suction will also be experienced within the cup 17 and the inside of the tube 22, thereby causing milk to flow from the cow through the tube 22 and into the cup 17. Also due to this suction, the cup will be in a lowered position on the ring 14 and its lower end therefore sealed. However, when the intermittent pressure is experienced the inside of the cup will experience a pressure greater than the atmospheric pressure, thereby forcing the cup member 17 upwardly clear of the ring 14 and permitting the accumulated milk within the cup member to pass downwardly therefrom and into the receptacle below the member 10. The milk being drawn into the cup member will obviously be intermittent and due to the position of the member 21 to the cup, it will enter the cup with a slight rotary motion, properly placing it completely around the lower end of the cup for its exit downwardly from around the disc 12 the last time the cup moves to an upward position. To eliminate any possibility of this milk being splashed upwardly or drawn into the tube 20 through the stem portion 19 of the cup, I have provided a splash ring 23 on the inside bottom of the cup 17 and loosely around the post 15 as shown in Fig. 1.

To disassemble my valve for cleaning purposes or for repair, it is merely necessary to lift the inverted cup member upwardly and free of the post 15 after which the rubber tubes 20 and 22 may be removed. Obviously the cup may be easily cleaned and kept in a sanitary condition as it is of simple construction and both the hollow stem 19 and conduit 21 are open at both ends and communicate with the inside of the cup proper.

Although most milking machines operate by the application of intermittent superatmospheric and subatmospheric air pressure to the milk connection of the teat cups, it is possible for a machine to operate on periodic minus pressures. Obviously in such machines, the elimination of intermittent plus pressures provides no means for intermittently raising the inverted cup member to permit the milk to pass through the valve. To overcome such a problem, I have provided a detachable float means, which I have designated by the numeral 24. This float means has radially extending fingers 25 for engaging the flared portion of the inverted cup member. This float means may obviously be removed or replaced in the inverted cup member. In cases where only minus pressures are experienced, the accumulating milk within the inverted cup member will act on the float means and periodically raise the inverted cup member upwardly to permit the milk therein to pass through the valve means. In my device when the milk flows out of the cup member the partial vacuum which has held the cup member 17 down is at once made ineffective and therefore the cup member rises considerably when the milk has left the member 17, the member is again sealed on the disc element 12, and partial vacuum is at once restored, so as to hold the member 17 down. The float means can also be used with machines having intermittent plus and minus pressures as the float valve will aid in raising the inverted cup member when a surplus amount of milk is in the inverted cup member.

Some changes may be made in the construction and arrangement of my improved valve for milking machines without departing from the real spirit and purpose of my invention, and it is my intention to cover by my claims any modified forms of structure or use of mechanical equivalents which may be reasonably included within their scope.

I claim:

1. In a device of the class described, a plate member having an opening, a disc having a diameter substantially less than that of the opening in said plate member; bracket means for supporting said disc in a position above the opening in said plate member; a gasket on the peripherial portion of said disc, an inverted cup member having its lower portion flared outwardly and downwardly for engagement with said gasket at times and its extreme lower marginal edge portion extending directly downwardly for entrance into the opening of said plate member, a post extending upwardly from said disc, a hollow stem on the bottom of said inverted cup member loosely embracing the upper portion of said post, a pipe communicating with the inside of said stem, and a conduit communicating with the inside of said inverted cup member.

2. In a device of the class described, a plate member having an opening, a disc having a diameter substantially less than that of the opening in said plate member, bracket means for supporting said disc in a position above the opening in said plate member, a gasket on the peripherial portion of said disc, an inverted cup member having its lower portion flared outwardly and downwardly for engagement with said gasket at times and its extreme lower marginal edge portion extending directly downwardly for entrance into the opening of said plate member, a post extending upwardly from said disc, air passageways in the upper end portion of said post, a hollow stem portion on the bottom of said inverted cup member communicating with the inside of said inverted cup member and slidably engaging the upper end of said post, a tube member having one end embracing said hollow stem portion, and a conduit secured to and communicating with the inside of said inverted cup member.

3. In a device of the class described, a plate member having an opening, a disc member having a diameter substantially less than that of the opening in said plate member, bracket means for supporting said disc in a position above the opening in said plate member, a gasket on the peripherial portion of said disc, an inverted cup member having its lower portion flared outwardly and downwardly for engagement with said gasket at times and its extreme lower marginal edge portion extending directly downwardly for entrance into the opening of said plate member, a post extending upwardly from said disc, air passageways in the upper end portion of said post, a hollow stem portion on the bottom of said inverted cup member communicating with the inside of said inverted cup member and slidably engaging the upper end of said post, a tube member having one end embracing said hollow stem portion, a conduit secured to and communicating with the inside of said inverted cup member, and a splash ring on the inside bottom of said inverted cup member loosely embracing said post.

4. In a valve, a fixed disc member, an inverted cup member having a flared bottom portion capable of embracing and resting on said disc member when in a lowered position, a means for mounting said inverted cup member for vertical reciprocation, and a conduit having one end communicating with the inside of said inverted cup member, its other end designed to be in communication with an intermittent source of pressure greater than that of the pressure of the outside atmosphere and a pressure less than that of the pressure of the outside atmosphere, and a float means within said inverted cup member and operatively connected to said inverted cup member.

5. In a device of the class described, a plate member having an opening, a disc having a diameter substantially less than that of the opening in said plate member, bracket means for supporting said disc in a position above the opening in said plate member, an inverted cup member mounted for vertical reciprocation and having a bottom flared portion capable of engaging and resting on the periphery of said disc member when in a lowered position, and a tube communicating with the inside of said inverted cup member.

6. In a device of the class described, a plate member having an opening, a disc having a diameter substantially less than that of the opening in said plate member, bracket means for supporting said disc in a position above the opening in said plate member, an inverted cup member having its lower portion flared outwardly and downwardly for engagement with said disc at times and its extreme lower marginal edge portion extending directly downwardly for entrance into the opening of said plate member, and two conduit members communicating with the inside of said inverted cup member.

7. In a device of the class described, a plate member having an opening, a disc having a diameter substantially less than that of the opening in said plate member, bracket means for supporting said disc in a position above the opening in said plate member, an inverted cup member having its lower portion flared outwardly and downwardly for engagement with said disc at times and its extreme lower marginal edge portion extending directly downwardly for entrance into the opening of said plate member, a post extending upwardly from said disc, air passageways in the upper end portion of said post, a hollow stem portion on the bottom of said inverted cup member communicating with the inside of said inverted cup member and slidably engaging the upper end of said post, a tube member having one end embracing said hollow stem portion, and a conduit secured to and communicating with the inside of said inverted cup member.

8. In a device of the class described, a plate member having an opening, a disc having a diameter less than that of the opening in said plate member, bracket means for supporting said disc, an inverted cup member having its lower portion flared outwardly and downwardly for engagement with said disc at times with its extreme lower marginal edge portion extending directly downwardly through the opening of said plate member, a post extending upwardly from said disc, air passageways in the upper end portion of said post, a hollow stem portion on the bottom of said inverted cup member communicating with the inside of said inverted cup member and slidably engaging the upper end of said post, a tube member having one end embracing said hollow stem portion, and a conduit secured to and communicating with the inside of said inverted cup member.

JESSE R. LOWRY.